United States Patent [19]

Few

[11] Patent Number: 5,180,131
[45] Date of Patent: Jan. 19, 1993

[54] SPRING LOADED JACK STAND
[75] Inventor: Jeffrey P. Few, West Hills, Calif.
[73] Assignee: Norco Industries, Inc, Compton, Calif.
[21] Appl. No.: 736,020
[22] Filed: Jul. 25, 1991
[51] Int. Cl.⁵ .................................. A47F 5/00
[52] U.S. Cl. .................... 248/352; 248/409; 254/108
[58] Field of Search .......... 248/352, 354.6, 354.7, 248/408, 409, 412, 411; 254/95, 133 A, 108

[56] References Cited

U.S. PATENT DOCUMENTS

| | | |
|---|---|---|
| 395,161 | 12/1888 | Maxon .................. 254/108 |
| 451,288 | 4/1891 | Maxon .................. 254/108 |
| 1,320,613 | 11/1919 | Gilcrease .............. 248/352 |
| 1,416,896 | 5/1922 | Simmons . |
| 1,894,293 | 1/1933 | Green ................ 254/108 X |
| 1,974,491 | 9/1934 | Hawley ................ 254/108 |
| 2,439,854 | 4/1948 | Lipski . |
| 3,370,817 | 2/1968 | Weber . |
| 3,599,923 | 8/1971 | Hunnicutt ............. 248/352 |
| 3,802,658 | 4/1974 | Binding . |
| 4,009,855 | 3/1977 | Hoffmann . |
| 4,021,012 | 5/1977 | Miller . |
| 4,042,202 | 8/1977 | Molinari . |
| 4,540,147 | 9/1985 | Lincourt .............. 254/133 R |
| 4,811,924 | 3/1989 | Walters . |
| 4,856,747 | 8/1989 | Gano ................. 248/354.7 |
| 4,889,357 | 12/1987 | Perry . |

Primary Examiner—J. Franklin Foss
Attorney, Agent, or Firm—Fulwider, Patton, Lee & Utecht

[57] ABSTRACT

A jack stand apparatus comprising a broad stable base to ensure safe support of a raised object with a selectively positioned vertical support member secured by a ratchet and pawl type engagement mechanism. The jack stand in its free state maintains the pawl in engagement with the ratchet by means of a torque spring which applies sufficient force to ensure engagement of the pawl with the ratchet in any position. This spring biased type pawl ensures engagement of the pawl and ratchet to prevent sudden movement of the vertical support member during transport. A pivot pin handle which carries said pawl and torque spring may be manually rotated with sufficient force to oppose the torque spring thus permitting disengagement of the pawl from the ratchet.

3 Claims, 1 Drawing Sheet

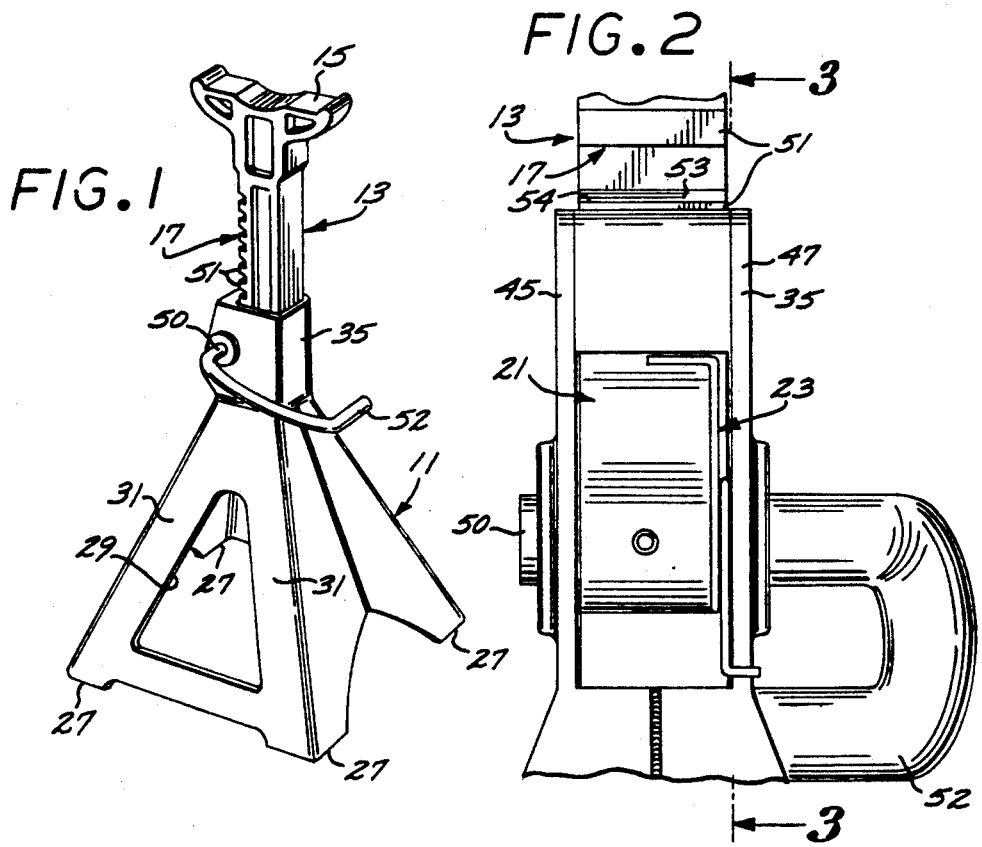
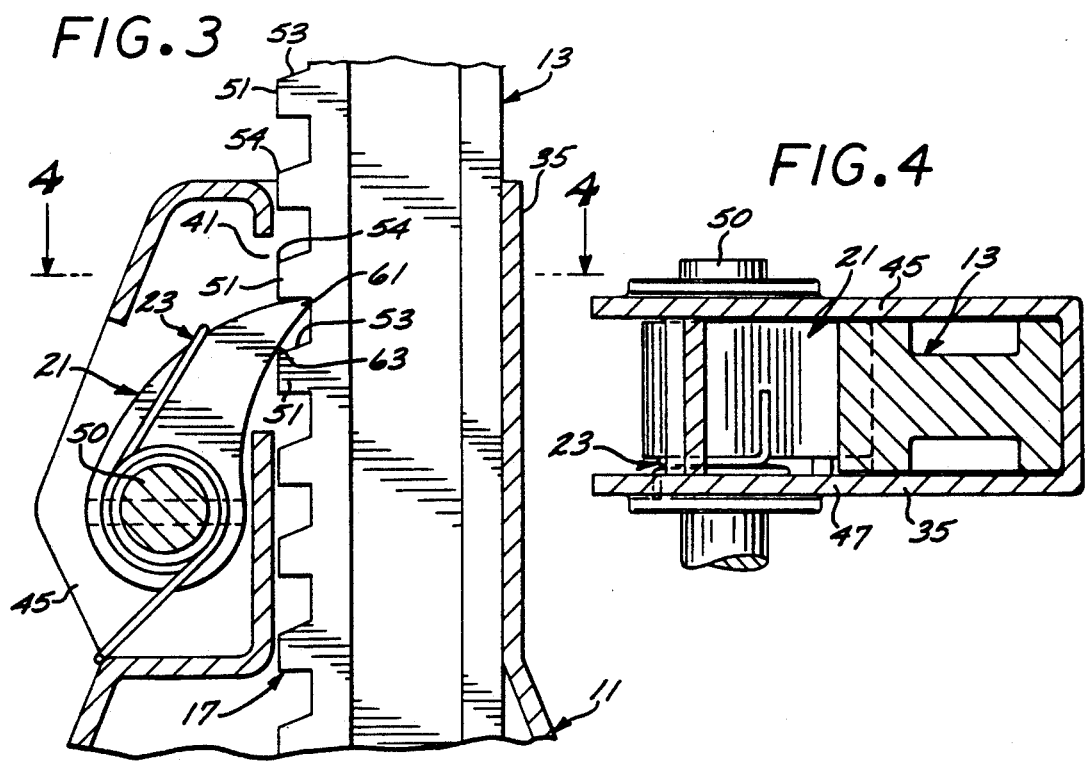

SPRING LOADED JACK STAND

BACKGROUND OF THE INVENTION

1. Field of the Invention

The present invention relates, generally, to a jack stand apparatus and more particularly to a jack stand with a spring triggered safety engagement.

2. Description of the Prior Art

The demand for inexpensive jack stands has arisen over the years due to a consumer need to perform a wide range of automobile maintenance and repair functions at home. Jacking type devices have proven to have certain safety drawbacks when used to maintain the automobile in a vertically suspended position. By utilizing inexpensive jack stands, a single more expensive jacking device may be used to meet all of the consumer's jacking needs. In its basic application, the jack stand provides a wide base and a sturdy support structure for maintaining a vehicle suspended in a raised position to enable maintenance and repair type functions to be performed on the vehicle. A variety of jack stands have been utilized to meet the diverse and changing needs of a society dependent on the automobile.

Jack stands, in general, have developed from a basic design which is made up of a sturdy wide base structure and a telescoping vertical support member or stem. The vertical support member can be adjusted to increase or decrease the overall height at which the jack stand will support a vehicle. Once a particular height has been selected, movement of the vertical member relative to the base is locked, in some manner, thereby providing a secure sturdy means of supporting the vehicle.

Devices of this type can fall generally into two categories. A first design category requires the insertion of an engaging pin to secure the vertical member at selected positions for various different heights relative to the base structure. While the pin type device provides a sturdy work structure, the limited number of holes allowed by the limits on structural integrity can substantially increase the distance between the jack stand and the height of an elevated vehicle. Designs of this type are shown in U.S. Pat. Nos. 1,416,896 by Simmons, 2,439,854 by Lipski, and 4,042,202 by Molinari. While satisfactory for some applications, in other applications jack stands of this type suffer shortcomings in positioning caused by large gaps between the jack stand and the elevated vehicle. These positioning errors may cause the jack stand to slide out of position or to support the automobile in an undesirable manner resulting in damage to other automobile components having insufficient structural integrity to support the weight of the vehicle. In order to avoid this problem the user may need to adjust the height of the stand while under the vehicle. This condition may expose the user to the dangers associated with a vehicle supported by a jacking device of the type which may not possess the structural integrity of a jack stand.

A second design category incorporates a set of interlocking teeth disposed on a vertical edge of the vertical support member. A pawl positioned on the base support structure by a pivot pin engages with the teeth providing a variety of support positions for the jack stand device. Typically such teeth are of a general saw tooth shape for free and rapid ratcheting upwardly of the stand relative to the pawl. A jack stand of this type is more convenient to position at a height closely nesting under the axle of the vehicle to be supported by a jacking device. By reducing the distance the vehicle will travel when the jacking device is released, the problems that may arise from a sudden change in the vertical position of the vehicle has been reduced.

The pawl is usually mounted on the base support structure by a pivot pin. When the vehicle is to be removed from the jack stand, the jacking device resumes the load of the vehicle and a handle located on the pivot pin may be grasped to release the pawl from engagement with the teeth of the vertical support member to free it for lowering. The handle provides a quick release allowing the vertical member to telescopically decline to its lowest position for quick retrieval from the underside of the vehicle. A device of this type is shown in U.S. Pat. No. 1,320,613 by Gilcrease.

While these ratchet type devices provide an advantage over the pin type jack stands, there still remains some disadvantages. The pawl engagement with the vertical support stem sustains the position of the vertical support member only against retraction into the base. This typically leaves the support stem free to be drawn or to fall free of the base and become disassociated therefrom.

This can create an unsafe situation for the automobile mechanics or do-it-yourselfer employing the stand. The general tendency is for the workman to, when transporting the stand from place to place, grasp it by either the stem or the base to carry it in an inverted orientation.

This can create a serious problem in that the vertical support stem is free to slide past the pawl free of the base to impact the workman's foot or toe. This condition can also result in a substantial hazard to the work area caused by the heavy vertical support member falling out of the base support and damaging other delicate tools or automobile components. Further, the unwanted disassociation of the vertical support from the base is an inconvenient and irritating problem for the workman seeking to repeatedly transport the stand from one location to another.

While some ratchet type designs provide a stop to restrict the vertical support member from coming completely free from the base structure, the vertical member may still slide freely out to a fully extended position. By creating such a sudden change in its center of gravity or impact upon engagement with the stop, the sudden load change may still cause the person carrying the device to drop the jack stand or allow the free falling stem to strike the workman or nearby object causing injury or damage.

Some ratchet type designs recommend a spring loaded pin to engage the vertical support member at its lowest vertical position within the base. This type of safety device locks the position of the vertical member within the base structure. The major drawback of this safety feature is that to be effective, the user must manually engage by pin each time the device is used. This manual engagement, which should be initiated during cleanup, may often be overlooked in the press of time often surrounding the completion of a major automotive repair project.

In instances where it is necessary to employ two to four jack stands for a particular task, the setting of a fixed equal height on all the jacks may be critical in providing a safe working environment. The procedure of moving the vertical support stem to the safety position may result in losing the specific height necessary for work on a continuing project. While the safety pin design provides a manually engaged safety device and a quick release to lower the device's height, there remains a safety hazard for those instances that would require that the jack stand be maintained in a pre-positioned height for continued work on a particular project.

Other ratchet type jack stands provide a pin to be biased into normal engagement with the teeth of the vertical support member. Disengagement of the pin can then only be accomplished by manually holding the pin in its disengaged position. This task can be difficult from certain positions under the car, especially if the mechanics hands are greasy, thus creating a safety hazard which hampers the effectiveness of the ratchet device to quickly adjust to various heights.

Consequently, there exists a need for a jack stand which can be quickly adjusted to permit convenient positioning and retrieval while securing the vertical support member from movement automatically when the device is being transported in an inverted position.

SUMMARY OF THE INVENTION

The current invention encompasses an improved jack stand including an adjustable height stem formed on one side with a rack of teeth. Such stem is adjustably locked at a selected height by a pawl biased into engagement by a torque spring between selected pairs of the teeth. The teeth and pawl are so configured and arranged as to cause the pawl to be normally engaged between a selected pair of teeth, in the supporting mode, to afford support against the upper tooth to maintain the stem elevated relative to the base. In the inverted position of the stand, the pawl is biased into engagement with the lower tooth of the pair to trap such stem from freely telescoping relative to such base.

The current invention further encompasses a convenient handle to operate a release mechanism to disassociate the pawl secured by torque spring engagement thus permitting the jack stand to quickly retain a diminutive height.

The combination of an improved ratchet tooth design, a dual traction pawl, and torque spring provides a sturdy jack stand with quick release and restraint against accidental separation of the stem from the base.

Other objects and features of the invention will become apparent from consideration of the following description taken in connection with the accompanying drawing.

BRIEF DESCRIPTION OF THE DRAWINGS

FIG. 1 is a perspective view of the improved jack stand of the present invention;

FIG. 2 is a broken side view, in enlarged scale, of the improved jack stand of FIG. 1 showing the ratchet engagement mechanism;

FIG. 3 is a vertical sectional view, taken along the line 3—3 of FIG. 2; and

FIG. 4 is a horizontal sectional view taken along the line 4—4 of FIG. 3.

DESCRIPTION OF THE PREFERRED EMBODIMENT

The jack stand apparatus of the present invention includes, generally, a pyramidal shaped base 11 having telescoped therein a stem 13 formed at its top end with a cradle 15 and along one side therewith a tooth rack 17. Referring to FIG. 3, mounted on the base 11 is a generally tear drop shaped pawl, generally designated 21, which is configured for engagement between pairs of teeth 51 in the rack 17. The pawl 21 is biased into positive engagement with such tooth rack 17 by means of a torque spring, generally designated 23, to thus cause such pawl to provide a support against weight placed on the stem 13, as well as to positively lock such stem against telescoping out of, and disengagement from, such base 11.

It has been common practice for automobile mechanics and do-it-yourselfers alike to utilize jack stands, for instance, to maintain an axle of an automobile elevated for convenient access to the underside of the vehicle for achieving repair work. Typically, such jack stands have incorporated an arrangement for maintaining different elevations of the supported vehicle. Some such jack stands have incorporated a rack tooth arrangement on an elevatable stem engageable by a pawl for the purpose of maintaining the elevatable stem at different selected adjusted heights. However, heretofore there has been no jack stands that incorporate a tooth and pawl arrangement which provides, not only for elevation of the stem to different heights, but also provides for locking the stem in its adjusted position against unwanted telescoping upwardly relative to the base 11 and consequent disengagement from such base.

It has been known to construct a base 11 of the general configuration shown for receiving and supporting a stem 13 of the same general configuration shown in the drawings. The base 11 is conveniently constructed of formed sheet metal conveniently formed at its bottom with four spaced apart feet 27 and in opposed walls with respective triangular apertures 29 to define in the lower portion of the base a rail 31. The base weighs about nine pounds so in a free fall can impart damage or injury upon impact. The base 11 is formed in its upper portion with a generally rectangular in cross section tubular neck 35 formed on the side with a window 41 confronting the tooth rack 17 (FIG. 3). The opposed walls of the neck 35 project laterally outwardly beyond the plane of the window 41 to form laterally spaced apart flanges 45 and 47 configured to receive therebetween the pawl 21. The pawl 21 is conveniently carried from such flanges 45 by means of a pivot pin 50. Such pivot pin has a lever arm projecting from one end thereof to define a handle 52. The pawl itself is generally tear drop shaped to curve upwardly and inwardly as shown in FIG. 3 for engagement between respective pairs of teeth 51 formed in the tooth rack 17.

The teeth 51 of the tooth rack 17 are of a conventional modified square configuration to be formed on their bottom and top sides with perpendicular surfaces to form the bottom surface and free end surfaces disposed in planes perpendicular to one another. The corner 54 formed between the bottom and top ends of such teeth defines a latch surface disposed for engagement with the underside of such pawl 21 to thereby limit upward travel of the stem relative to the base 11. The top surfaces 53 of the teeth 51 then angle upwardly and inwardly as viewed in FIG. 3 at an angle of approximately 30° to the horizontal.

The pawl 21 is configured such that its top end angles upwardly and inwardly, terminating in a somewhat pointed tip end 61 which is configured to engage beneath the bottom surface of the respective teeth 51 to support the stem 13 against the weight of the vehicle carried on the cradle 15. The interior surface of the pawl confronting the teeth 51 curves upwardly and inwardly, when engaged as shown in FIG. 3, to be disposed in the path of the upper outer latch corner 54 of the tooth 51 disposed therebelow. Thus, such upper outer corner 54 of the tooth will, upon upward travel of the stem 13 relative to such pawl, engage such pawl along the latch stop line designated 63 (FIG. 3) thereby causing the pawl to act as a latch preventing unwanted upward travel of the stem 13 relative to the base 11.

If desirable, the teeth 51 may be square without slope to the upper side 54. However, for the 30+ incline shown in FIG. 3, it is possible, under the right condition, to ratchet the stem to its extended position. That is, the operator may place his feet on the opposite rail 31 and draw upwardly on the stem 13 with a force in excess of 15 pounds to cause the upwardly acting force to overcome the torque applied by the spring 23 to deflect the pawl 21 out of the path of the teeth 51. The stem may thus be ratcheted rapidly upwardly to position the cradle 15 at the approximate desired height.

However, for normal operation of the configuration shown, it has been discovered that by constructing the spring 23 with a sufficient torque, the configuration of the tooth and pawl arrangement will normally latch such stem against unwanted extension. That is, the spring 23 is selected to cooperate with the handle 52 to provide a sufficient clockwise torque on the pawl 21 as viewed in FIG. 3 to maintain such pawl in its engaged position between the adjacent teeth with sufficient force to resist telescopical disengagement of the stem 13 from the base 11 upon the stand itself being inverted and the full weight of the stem 13 and yoke 15 being applied to the pawl.

In this regard, for a conventional five ton rated jack, a forged stem and yoke typically having a weight of about 5¼ pounds, the spring may be situated to apply torque sufficient to cause the pawl 21 to resist extension of such stem under its own weight. For this configuration, it has been found that with an angle for the upper surface of the tooth of about 30° the torque provided is sufficient to latch the 5¼ pound stem and yoke against unintentional telescoping from the neck 35 with the jack stand inverted. This has been found particularly useful in preventing unwanted disassociation of the stem from the base which might result in injury to the workman or inconvenience from separation of the stand parts. The slope of this top surface may, in fact, be increased but must be maintained less than 45° to the horizontal.

It has also been found that for a conventional base 11 for a jack stand of a five ton rating, the spring 23 will apply sufficient torque to the pawl 21 to maintain it engaged with sufficient force to maintain the stem latched against telescoping upwardly thereof when the workman grasps the cradle 15 to bodily lift the jack stand and carry it from place to place.

In operation, it will be appreciated that the jack stand may be positioned under an elevated automobile axle and the handle 52 grasped with one hand to rotate the pawl counterclockwise as viewed in FIG. 3 to move the tip 61 and latch surface 63 out of the path of the teeth 51 to free the stem 13 for elevation thereof to the desired height for the cradle 15. Release of the handle 52 will then free the pawl 21 to be biased into its locking and latching position shown in FIG. 3 to thus lock the stem 13 against lowering thereof. The jack (not shown) may then be lowered to lower the weight of the axle onto the cradle 15.

When the repair job is completed and it is desirable to lower the vehicle axis, the jack may again be operated to raise the axle and free the cradle 15. The handle 52 may then be rotated counterclockwise to rotate the pawl 21 clear of the teeth 51 to thereby free the stem 13 for lowering relative to the base. The jack stand will then be available for moving to another location for either storage or use in another automobile repair job.

Such movement to another location may be conveniently achieved by, for instance, grasping the cradle 15 and carrying such jack stand to the desired location. It will be appreciated that under such conditions, the pawl 21 will be urged to its clockwise position shown in FIG. 3 with sufficient force to maintain engagement of the latch surface 63 with the upper outer edge of the tooth 51 disposed therebelow. This then serves to positively maintain the stem 13 and base 11 in engagement with one another to thereby prevent unwanted disassociation thereof and possible dropping of the base onto the worker's toe, foot or leg.

In some instances, it is common practice for the workman to, in transporting the jack stand about, grasp the rail 31 and transport such jack stand from place to place. In this instance, the jack stand even though inverted will serve to maintain the stem in its securely latched position.

What is claimed is:

1. A jack stand comprising:
   a base formed at the apex with a hollow, upwardly opening vertical neck of rectangular configuration and one wall of said base formed with a window, said base having a predetermined height;
   a flange adjacent to said window and projecting from said neck;
   an elongated stem received telescopically in said neck and formed with a tooth rack extending along the side thereof confronting said window, said rack including longitudinally spaced apart horizontally projecting teeth each formed on their bottom sides with a downwardly facing horizontal support surface and on its upper side with a surface sloping upwardly and inwardly from the free end of the tooth at an angle of no greater than 45° from the horizontal and terminating at its outer edge in a corner defining a latch stop;
   a pivot pin carried from said flange, adjacent said window;
   a crank handle carried from one end of said pivot pin and formed with a hand grasp rod;
   a pawl carried from said pivot pin and configured to curve upwardly and inwardly in one direction to terminate in a tip configured to be selectively engageable under the respective support surfaces of said teeth and configured on its bottom side with a limit surface to be disposed in the path of said teeth and selectively engageable against said respective latch stops; and
   a torque spring interposed between said pivot pin and pawl to urge said pawl into engagement between the respective teeth of said rack with a predetermined torque, said teeth and pawl being so configured and arranged that said predetermined torque on said pawl is sufficient to, when said pawl is engaged over the latch stop of a selected tooth and said stem is grasped by a workman and lifted, maintain said limit surface disposed in the path of said latch stop of said selected tooth with sufficient force to enable said base to be carried from said stem.

2. A jack stand as set forth in claim 1 wherein said teeth are formed with an upper surface that angles upwardly and inwardly toward the axis of the stand at an angle 30° to the horizontal.

3. A jack stand as set forth in claim 1 wherein said torque spring embraces said pivot pin formed with one end engaging said pawl and the opposite end engaging said base.

* * * * *